United States Patent
Matsuo

(10) Patent No.: US 9,860,424 B2
(45) Date of Patent: Jan. 2, 2018

(54) IMAGE FORMING APPARATUS UPDATING GAMMA CORRECTION TABLE TO THEREBY EXECUTE CALIBRATION AND RECORDING MEDIUM

(71) Applicant: KYOCERA Document Solutions Inc., Osaka (JP)

(72) Inventor: Masaru Matsuo, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/190,359

(22) Filed: Jun. 23, 2016

(65) Prior Publication Data

US 2016/0381248 A1    Dec. 29, 2016

(30) Foreign Application Priority Data

Jun. 25, 2015    (JP) .................................. 2015-127538

(51) Int. Cl.
| G06K 15/02 | (2006.01) |
| H04N 1/407 | (2006.01) |
| H04N 1/00  | (2006.01) |

(52) U.S. Cl.
CPC ....... H04N 1/4078 (2013.01); H04N 1/00005 (2013.01); H04N 1/00015 (2013.01); H04N 1/00037 (2013.01); H04N 1/00087 (2013.01); H04N 2201/0082 (2013.01)

(58) Field of Classification Search
USPC .............. 358/1.1–3.29, 1.11–1.18, 504, 519
See application file for complete search history.

(56) References Cited

U.S. PATENT DOCUMENTS

| 8,089,657 B2 | 1/2012 | Matsuo | |
| 2008/0205916 A1* | 8/2008 | Zaima | G03G 15/5058 399/27 |
| 2009/0150104 A1* | 6/2009 | Matsuo | G03G 15/5025 702/85 |
| 2010/0086320 A1* | 4/2010 | Koizumi | G03G 15/0872 399/30 |
| 2012/0086987 A1* | 4/2012 | Tamura | G03G 15/011 358/3.24 |

FOREIGN PATENT DOCUMENTS

| JP | 2000-184217 A | 6/2000 |
| JP | 2007-311998 A | 11/2007 |
| JP | 2009-141714 A | 6/2009 |

* cited by examiner

*Primary Examiner* — Marcellus Augustin
(74) *Attorney, Agent, or Firm* — Studebaker & Brackett PC

(57) ABSTRACT

An image forming apparatus includes: a printing device, a detection device, a processor, and a storage device. The printing device prints, with concentration corresponding to each input value, an image on a recording medium for the each input value. The detection device detects a concentration value of the each image. The storage device stores each variation information previously set for the each input value. The each variation information indicates a specific concentration value and a range of variation from the specific concentration value. The processor converts, of the concentration values detected by the detection device, the concentration value included in the corresponding variation range into the corresponding specific concentration value. The processor, based on the each concentration value obtained through the conversion process, generates a new gamma correction table.

4 Claims, 17 Drawing Sheets

IMAGE FORMING APPARATUS UPDATING GAMMA CORRECTION TABLE TO THEREBY EXECUTE CALIBRATION AND RECORDING MEDIUM

INCORPORATION BY REFERENCE

The present application claims priority under 35 U.S.C. §119 to Japanese Patent Application No. 2015-127538, filed Jun. 25, 2015. The contents of this application are incorporated herein by reference in their entirety.

BACKGROUND

This disclosure relates to an image forming apparatus updating a gamma correction table for correcting input/output characteristics of a printing device, and a non-transitory computer-readable recording medium including a calibration program.

A typical image forming apparatus is known, which executes calibration for making the input/output characteristics of the printing device equal to desired input/output characteristics. The typical image forming apparatus updates the gamma correction table to thereby execute the calibration.

In a case where the image forming apparatus includes an electrophotographic printer as the printing device, as a result of a temperature or humidity change, the input/output characteristics of the printing device may no longer be equal to the desired input/output characteristics. More specifically, an amount of toner adhering to a recording medium may change. Long-term continuous execution of printing by the image forming apparatus may, for example, cause changes in temperatures of various sections of the printer. Therefore, as a result of the long-term continuous execution of printing, the input/output characteristics of the printing device may no longer be equal to the desired input/output characteristics. As a result of long-term use of the image forming apparatus, characteristics of the various sections of the printer may change. For example, the charging characteristics of a photosensitive drum may change. Therefore, as a result of the long-term use of the image forming apparatus, the input/output characteristics of the printing device may no longer be equal to the desired input/output characteristics.

Therefore, in a case where one of parameters such as humidity, temperature, and the number of prints has satisfied corresponding one of given conditions respectively set for these parameters, the image forming apparatus executes the calibration. The typical image forming apparatus executes the calibration as shown in FIG. 13.

FIG. 13 is a flowchart of an operation performed by the image forming apparatus at time of the execution of the calibration.

As shown in FIG. 13, the image forming apparatus renders a patch pattern, which is formed of any given screen, on a recording medium by the printer (step S51). The patch pattern includes a plurality of patch images.

Next, the image forming apparatus measures respective concentration values of the plurality of patch images included in the patch pattern rendered on the recording medium in step S51 (step S52). More specifically, the image forming apparatus individually reads the patch images with a photo sensor such as a reflection densitometer. The image forming apparatus measures the concentration value of each patch image based on a corresponding output of the photo sensor.

FIG. 5 is a diagram illustrating one example of the input/output characteristics of the printer. In FIG. 5, a horizontal axis represents input values and a vertical axis represents concentration values. FIG. 5 shows correspondence relationship between the input values and the concentration values measured in step S52. In other words, FIG. 5 shows the correspondence relationship between the input values and the concentration values measured by use of the photo sensor.

As shown in FIG. 5, the measured concentration values may include any concentration value exceeding "Dmax" in some cases. The "Dmax" is a designed maximum concentration value of the image forming apparatus. In FIG. 5, "Dmin" is a designed minimum concentration value of the image forming apparatus. In FIG. 5, each open circle is plotted to indicate the concentration value of each patch image measured in step S52. That is, each open circle denotes a sampling point.

As shown in FIG. 13, the image forming apparatus starts a loop process after the process of step S52 (step S53). More specifically, the image forming apparatus individually repeats the processes of steps S54 to S56 for all the concentration values of the patch images measured in step S52. In other words, the image forming apparatus repeats the processes of steps S54 S56 for each input value.

In step S54, the image forming apparatus normalizes the concentration value measured in step S52 by formula (1) below. In formula (1), "Din" is the concentration value measured in step S52. "Dout" is a concentration value obtained by normalizing the concentration value Din. "N" is a designed maximum tone value of the image forming apparatus. The maximum tone value N is, for example, 255.

$$Dout = (Din - Dmin)/(Dmax - Dmin) \times N \qquad (1)$$

In step S55, the image forming apparatus judges whether or not the concentration value Dout generated in step S54 exceeds the maximum tone value N.

As a result of judgment that the concentration value Dout exceeds the maximum tone value N (Yes in step S55), the image forming apparatus converts the concentration value Dout into "N" (step S56). In other words, in a case where the concentration value Din measured in step S52 exceeds the designed maximum concentration value Dmax of the image forming apparatus, the image forming apparatus converts the concentration value Din into the maximum concentration value Dmax.

FIG. 14 is a diagram obtained by normalizing the input/output characteristics shown in FIG. 5. In FIG. 14, a horizontal axis represents input values and a vertical axis represents concentration values.

As shown in FIG. 14, of outputs of the normalized input/output characteristics, any output exceeding the maximum tone value N is converted into "N". Hereinafter, the outputs of the normalized input/output characteristics may be described as outputs obtained by the normalization.

As shown in FIG. 13, as a result of ending of the loop process (step S59), the image forming apparatus executes interpolation in a manner such that the outputs obtained by the normalization are smoothly connected together (step S60). More specifically, the image forming apparatus interpolates between the sampling points obtained by the normalization.

FIG. 15 shows a graph obtained through the interpolation executed on the input/output characteristics shown in FIG. 14. In FIG. 15, a horizontal axis represents input values and a vertical axis represents concentration values.

As shown in FIG. 15, as a result of the interpolation executed in step S60, the sampling points are arranged in a manner such as to be smoothly connected together.

As shown in FIG. 13, after the process of step S60, the image forming apparatus generates a gamma correction table (step S61). The gamma correction table is generated based on the graph generated in step S60 and the desired input/output characteristics.

FIG. 8 is a diagram illustrating one example of the desired input/output characteristics. In FIG. 8, a horizontal axis represents input values and a vertical axis represents concentration values. FIG. 16 is a diagram illustrating the gamma correction table generated from the graph shown in FIG. 15. In FIG. 16, a horizontal axis represents input values and a vertical axis represents input values obtained through gamma correction.

With the desired input/output characteristics shown in FIG. 8, the input values and the output values are in a directly proportional relationship. In this case, the image forming apparatus generates a graph line-symmetric to the graph shown in FIG. 15 with the graph shown in FIG. 8 as a symmetric axis. The graph line-symmetric to the graph shown in FIG. 15 is the gamma correction table shown in FIG. 16. The graph shown in FIG. 16 is a graph with a function inverse to that of the graph shown in FIG. 15.

As shown in FIG. 13, after the process in step S61, the image forming apparatus updates a gamma correction table corresponding to the screen used in step S51 to the gamma correction table generated in step S61 (step S62). Operation shown in FIG. 13 ends as a result of the update of the gamma correction table.

As a result of gamma correction of the input/output characteristics shown in FIG. 5 with reference to the gamma correction table shown in FIG. 16, by the image forming apparatus, the input/output characteristics shown in FIG. 5 are changed to input/output characteristics shown in FIG. 17. In FIG. 17, a horizontal axis represents input values and a vertical axis represents concentration values.

SUMMARY

An image forming apparatus according to one aspect of this disclosure includes: a printing device, a detection device, a processor, and a storage device. The printing device prints, with concentration corresponding to each input value, an image on a recording medium for the each input value. The detection device detects a concentration value of the each image. The processor corrects input/output characteristics of the printing device with reference to a gamma correction table for correcting the input/output characteristics of the printing device. The storage device stores each variation information previously set for the each input value. The each variation information indicates a specific concentration value and a range of variation from the specific concentration value. The processor executes a conversion process of converting, of the concentration values detected by the detection device, the concentration value included in the corresponding variation range into the corresponding specific concentration value. The processor, based on the each concentration value obtained through the conversion process, newly generates the gamma correction table to thereby update the gamma correction table.

A non-transitory computer-readable recording medium according to another aspect of this disclosure records a calibration program to be executed by a computer. The calibration program includes: a first program code, a second program code, a third program code, and a fourth program code. The first program code causes the computer to command a printing device to print an image on a recording medium for each input value with concentration corresponding to the each input value. The second program code causes the computer to command a detection device to detect a concentration value of the each image. The third program code causes the computer to execute, on the each concentration value detected by the detection device, a conversion process based on each variation information previously set for the each input value. The fourth program code causes the computer to update a gamma correction table based on the each concentration value obtained through the conversion process. The each variation information indicates a specific concentration value and a range of variation from the specific concentration value. The conversion process is a process of converting, of the concentration values detected by the detection device, the concentration value included in the corresponding variation range into the corresponding specific concentration value by the computer.

BRIEF DESCRIPTION OF THE RENDERINGS

DETAILED DESCRIPTION

Hereinafter, an embodiment of this disclosure will be described with reference to the drawings.

First, configuration of a multifunction peripheral (MFP) according to this embodiment will be described. The MFP is one example of an image forming apparatus.

Figure 1:
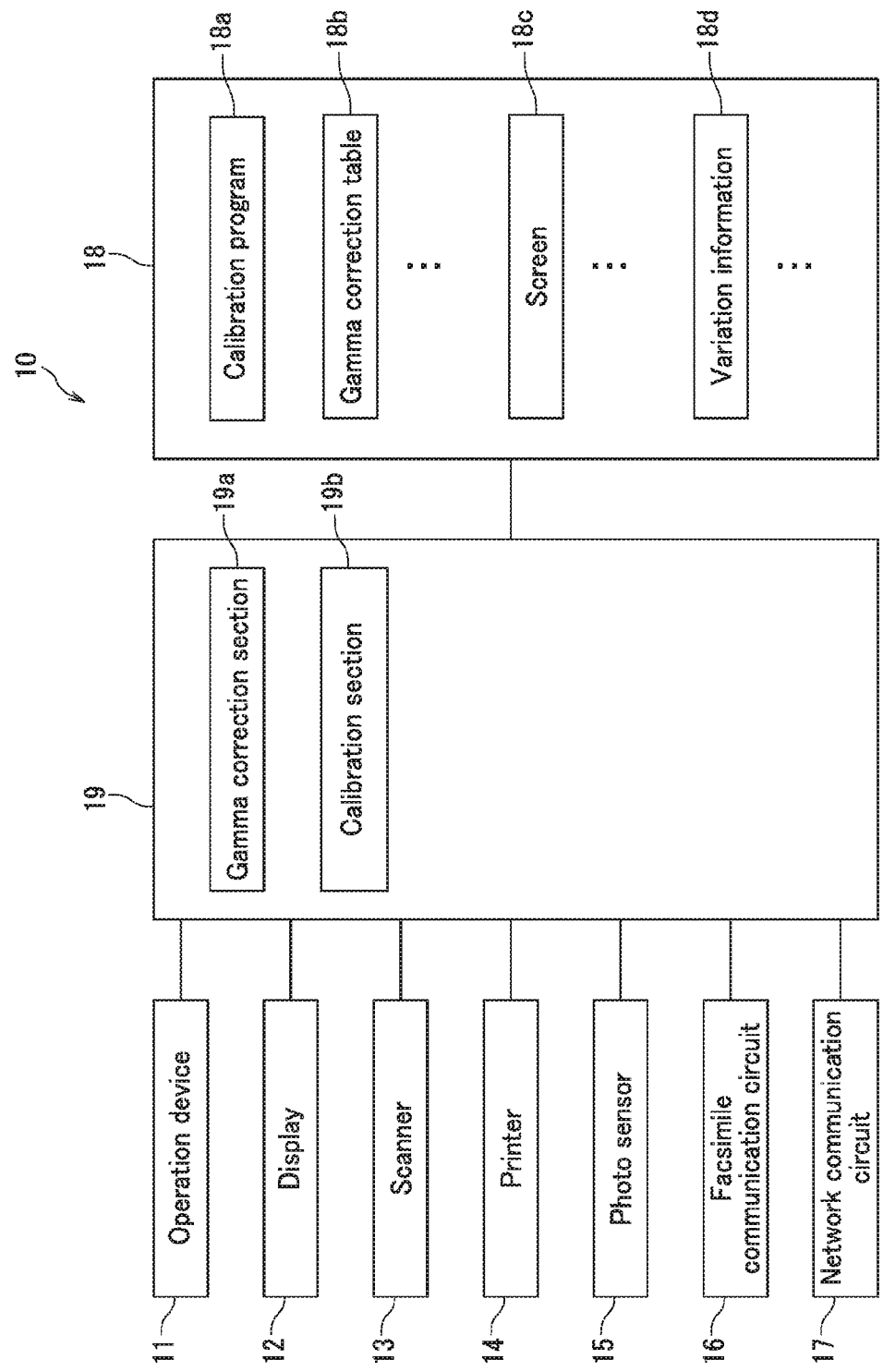
FIG. 1 is a diagram illustrating a block configuration of an MFP according to an embodiment of the present disclosure.

FIG. 1 is a diagram illustrating a block configuration of the MFP 10.

As shown in FIG. 1, the MFP 10 includes: an operation device 11, a display 12, a scanner 13, a printer 14, a photo sensor 15, a facsimile communication circuit 16, a network communication circuit 17; a controller 19, and a storage device 18.

The operation device 11 is operated by a user. In accordance with various types of operations by the user, the MFP 10 executes various processes. The operation device 11 may be an input device such as a button.

The display 12 displays various pieces of information. The display 12 is a display device such as a liquid crystal display (LCD).

The scanner 13 is a reading device which reads data from a document.

The printer 14 is a printing device which executes printing on a recording medium such as paper. The printer 14 prints an image (forms an image) on the recording medium with concentration in accordance with an input value.

The photo sensor 15 is a detection device which detects a concentration value of the image printed on the recording medium by the printer 14.

The facsimile communication circuit 16 is a facsimile device which performs facsimile communication with an external facsimile device (not shown) via a communication line such as a public phone line.

The network communication circuit 17 is a communication device which performs communication with an external device (not shown via a network such as a local area network (LAN) or the Internet.

The storage device 18 stores various pieces of data. The storage device 18 may include, for example, a semiconductor memory and/or a hard disk drive (HDD).

The controller 19 controls the entire MFP 10.

The printer 14 is an electrophotographic printing device.

The storage device 18 stores various screens 18c for reproducing a half tone by the printer 14. The storage device 18 also stores a gamma correction table 18b for each of the screens 18c. Each gamma correction table 18b is used for correcting input/output characteristics of the printer 14. More specifically, each gamma correction table 18b is used for correcting the half tone included in the input/output characteristics.

The storage device 18 stores a calibration program 18a for updating each gamma correction table 18b. The calibration program 18a may be installed in the MFP 10 at time of manufacture of the MFP 10, may be additionally installed in the MFP 10 from a recording medium such as an SD card or a universal serial bus (USB) memory, or may be additionally installed in the MFP 10 via the network.

The storage device 18 stores variation information 18d for concentration values of each patch pattern. Each patch pattern is formed of the corresponding screen 18c. Each patch pattern includes a plurality of patch images. The variation information 18d indicates a range of variation in each output (concentration value) previously set for each input value. At time of acquisition of the variation information 18d, the patch pattern is rendered on a recording medium by the printer 14. The plurality of patch images included in the patch pattern rendered on the recording medium are individually read by the photo sensor 15. Based on outputs of the photo sensor 15, respective concentration values of the patch images are measured. Based on the measured concentration values, acquired is the variation information 18d on the concentration values of the patch pattern rendered on the recording medium.

Figure 2:
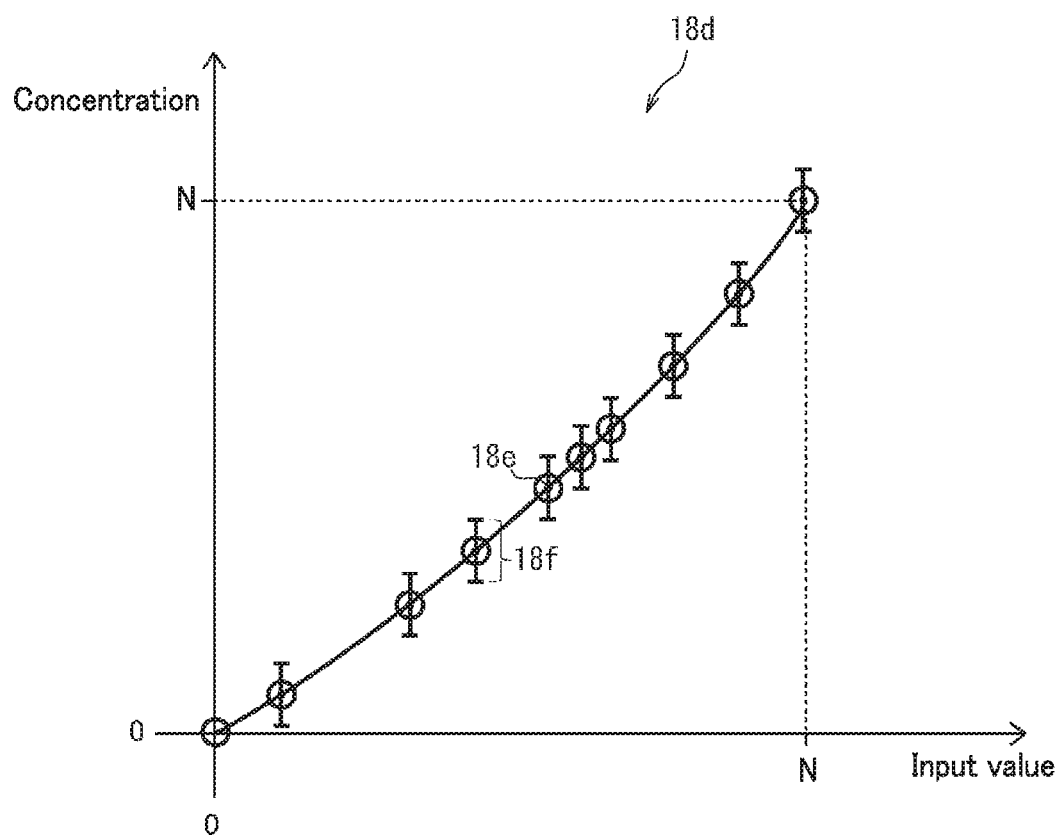
FIG. 2 is a diagram illustrating one example of variation information shown in FIG. 1.

FIG. 2 is a diagram illustrating one example of the variation information 18d. In FIG. 2, a horizontal axis represents input values and a vertical axis represents concentration values.

As shown in FIG. 2, the variation information 18d is information which specifies, for each input value, a specific concentration value 18e and a variation range 18f. Included in each variation range 18f is the corresponding specific concentration value 18e. The specific concentration value 18e is a concentration value obtained by excluding variation from the corresponding variation range 18f. In other words, the variation range 18f indicates a range of variation from the corresponding specific concentration value 18e. The variation information 18d is generated, for example, based on data of a large number of times of experiments made by use of the printer 14 and the photo sensor 15.

The controller 19 shown in FIG. 1 is, for example, a microcomputer including: a central processing unit (CPU), a read only memory (ROM), and a random access memory (RAM). The ROM stores programs and various pieces of data. The RAM is used as a working area of the CPU. The CPU executes a program stored in the ROM or the storage device 18. The CPU is one example of a computing device or a microprocessor.

The controller 19 executes the program stored in the storage device 18 and thereby functions as a gamma correction section 19a. The gamma correction section 19a (controller 19) corrects the input/output characteristics of the printer 14 with reference to the gamma correction table 18b.

The controller 19 executes the calibration program 18a stored in the storage device 18 and thereby functions as a calibration section 19b. The calibration section 19b (controller 19) updates the gamma correction table 18b based on the concentration values detected by the photo sensor 15.

Next, operation performed by the MFP 10 will be described.

First, the operation performed by the MFP 10 at time of execution of calibration for making the input/output characteristics of the printer 14 equal to desired input/output characteristics will be described.

Figure 3:
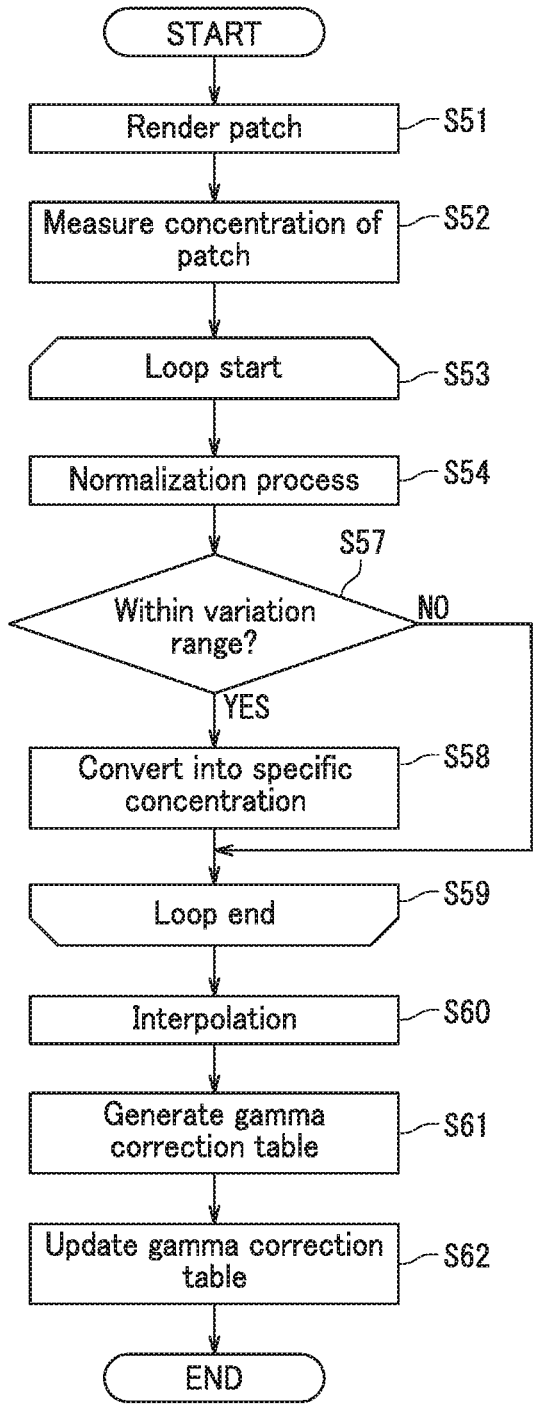
FIG. 3 is a flowchart illustrating operation performed by the MFP shown in FIG. 1 at time of execution of calibration.

The MFP 10 executes the calibration as shown in FIG. 3 in a case where one of parameters such as humidity, a temperature, and a number of prints has satisfied corresponding one of given conditions respectively set for these parameters.

FIG. 3 is a flowchart of the operation performed by the MFP 10 at time of the execution of calibration.

As shown in FIG. 3, the calibration section 19b (controller 19) of the MFP 10 renders a patch pattern formed of the given screen 18c on a recording medium by the printer 14 (step S51).

Figure 4:
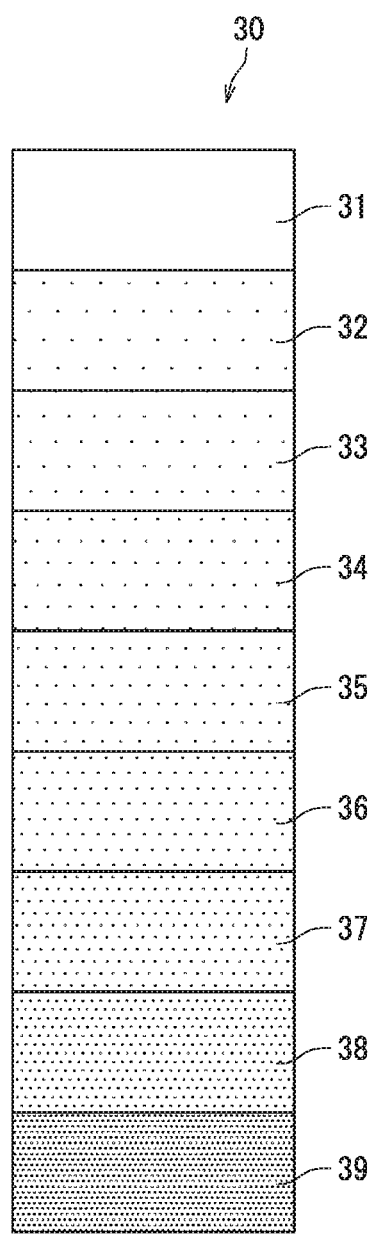
FIG. 4 is a diagram illustrating one example of a patch pattern rendered on a recording medium in the operation shown in FIG. 3.

FIG. 4 is a diagram illustrating one example of the patch pattern 30 rendered on the recording medium in step S51. As shown in FIG. 4, the patch pattern 30 is an image whose concentration varies in a stepwise fashion. The concentration of the patch pattern 30 varies in the stepwise fashion in accordance with a number of tones of the corresponding screen 18c.

The patch pattern 30 shown in FIG. 4 includes nine mutually different patch images 31 to 39. The patch images 31, 32, 33, 34, 35, 36, 37, 38, and 39 have concentration values which increase in this order. The patch image 31 located on an uppermost side in FIG. 4 has the lowest concentration value of those of the patch images 31 to 39. In FIG. 4, the patch image 39 located on a lowermost side in FIG. 4 has the highest concentration value of those of the patch images 31 to 39. The respective concentration values of the nine patch images 31 to 39 are already known. The respective concentration values of the nine patch images 31 to 39 are input values.

As shown in FIG. 3, after the process of step S51, the calibration section 19b (controller 19) measures the respective concentration values of the nine patch images 31 to 39 included in the patch pattern rendered on the recording medium in step S51 (step S52). More specifically, the calibration section 19b individually reads the patch images 31 to 39 by the photo sensor 15. The calibration section 19b, based on outputs of the photo sensor 15, measures the respective concentration values of the patch images 31 to 39.

Figure 5:
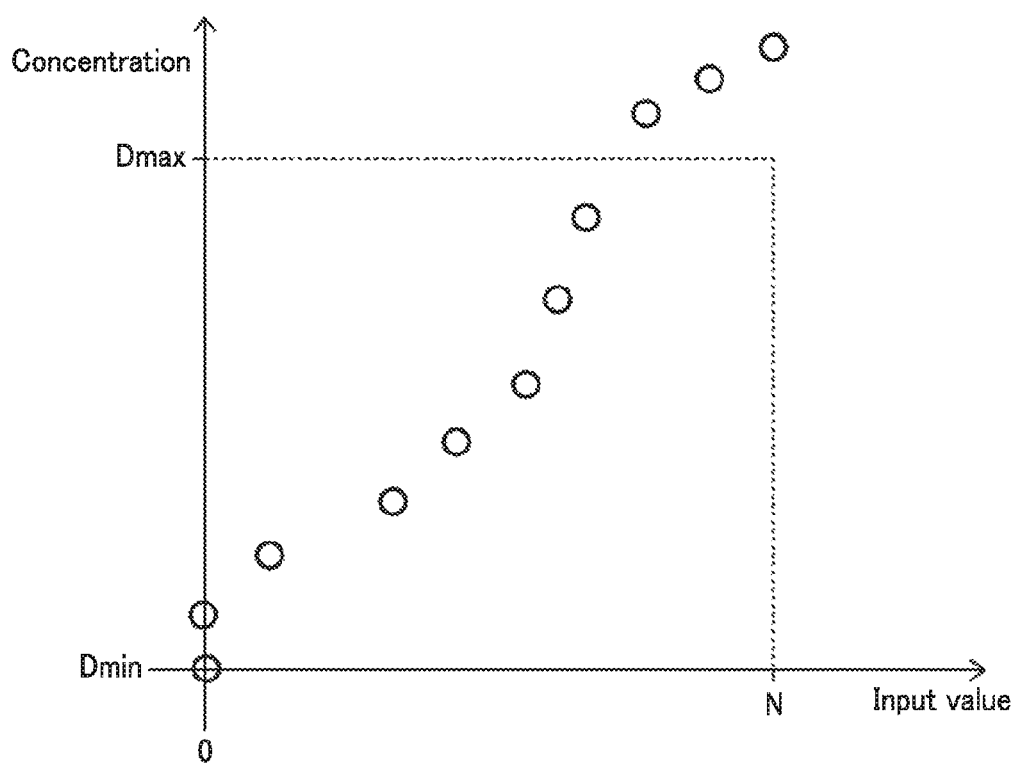
FIG. 5 is a diagram illustrating one example of input/output characteristics of a printer shown in FIG. 1.

FIG. 5 is a diagram illustrating one example of the input/output characteristics of the printer 14. In FIG. 5, a horizontal axis represents input values and a vertical axis represents concentration values. FIG. 5 shows correspondence relationship between the input values and the concentration values measured in step S52. In other words, FIG. 5 shows the correspondence relationship between the input values and the concentration values measured by use of the photo sensor 15.

As shown in FIG. 5, the measured concentration values may include any concentration value exceeding "Dmax" in some cases. The "Dmax" is a designed maximum concentration value of the MFP 10. In FIG. 5, "Dmin" is a designed minimum concentration value of the MFP 10. In FIG. 5, open circles are plotted to indicate the respective concentration values of the patch images measured in step S52. That is, each open circle indicates a sampling point.

As shown in FIG. 3, after the process of step S52, the calibration section 19b (controller 19) starts a loop process (step S53). More specifically, the calibration section 19b repeats a normalization process of step S54 and conversion processes of steps S57 and 58 individually on each of all the concentration values of the patch images measured in step S52. In other words, the calibration section 19b repeats the processes of steps 54, 57, and 58 for each input value.

In step S54, the calibration section 19b (controller 19) normalizes the concentration value measured in step S52 by formula (1) shown below. In formula (1), "Din" is the concentration value measured in step S52. "Dout" is a concentration value obtained by normalizing the concentration value Din. "N" is a designed maximum tone value of the MFP 10. The maximum tone value N is, for example, 255.

$$Dout=(Din-Dmin)/(Dmax-Dmin)\times N \qquad (1)$$

Figure 6:
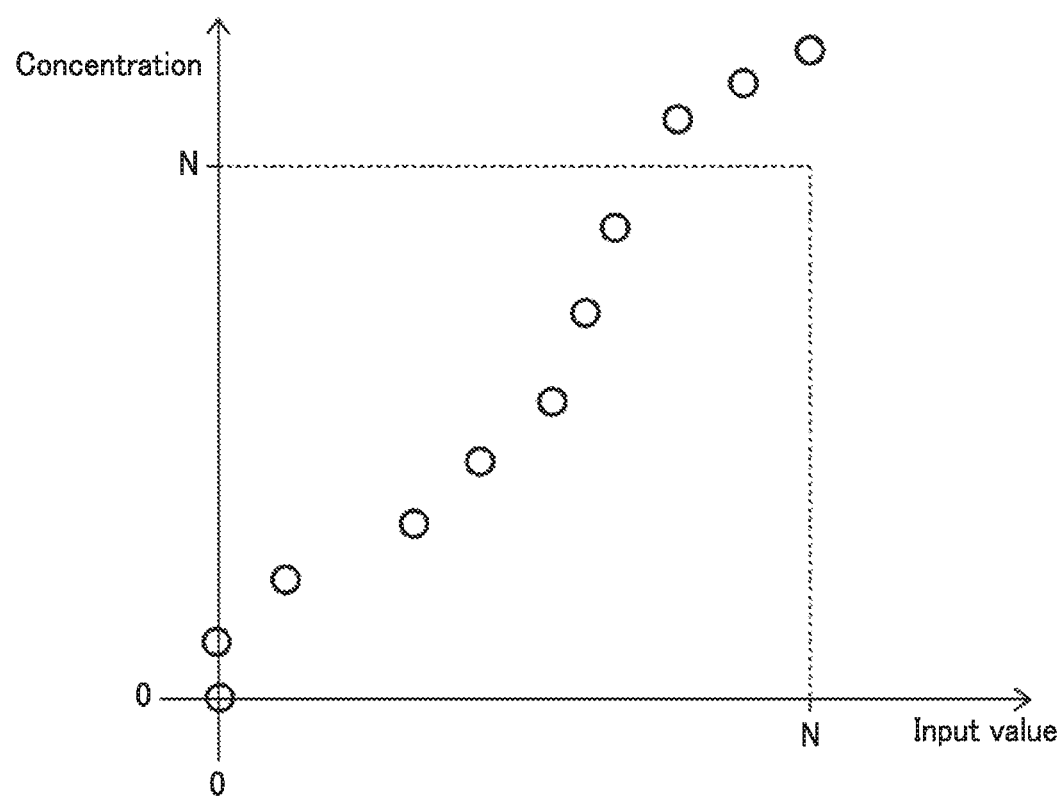
FIG. 6 is a diagram obtained by normalizing the input/output characteristics shown in FIG. 5 by the MFP shown in FIG. 1.

FIG. 6 is a diagram obtained by normalizing the input/output characteristics shown in FIG. 5. In FIG. 6, a horizontal axis represents input values and a vertical axis represents concentration values.

As shown in FIG. 6, outputs obtained by the normalization (outputs of the normalized input/output characteristics) may include any output exceeding the maximum tone value N in some cases. In this embodiment, the output exceeding the maximum tone value N is kept at its value without being converted into a value equal to or less than "N".

As shown in FIG. 3, after the process of step S54, the calibration section 19b (controller 19) executes the process of step S57. More specifically, the calibration section 19b specifies the variation information 18d corresponding to the patch pattern rendered in step S51. The calibration section 19b, with reference to the specified variation information 18d, judges whether or not the output obtained by the normalization is included in the corresponding variation range 18f. The variation range 18f is set based on the output obtained before the normalization.

The calibration section 19b (controller 19), as a result of judgment that the output obtained by the normalization is included in the variation range 18f (Yes in step S57), converts the output obtained by the normalization into the specific concentration value 18e included in the corresponding variation range 18f (step S58).

The calibration section 19b (controller 19), as a result of judgment that the output obtained by the normalization is not included in the variation range 18f (No in step S57), maintains the output obtained by the normalization at its current value.

The calibration section 19b (controller 19), as a result of ending of the loop process (step S59), executes interpolation in a manner such that the outputs obtained by the normalization are smoothly connected together (step S60). More specifically, the calibration section 19b interpolates between the sampling points obtained by the normalization.

Figure 7:
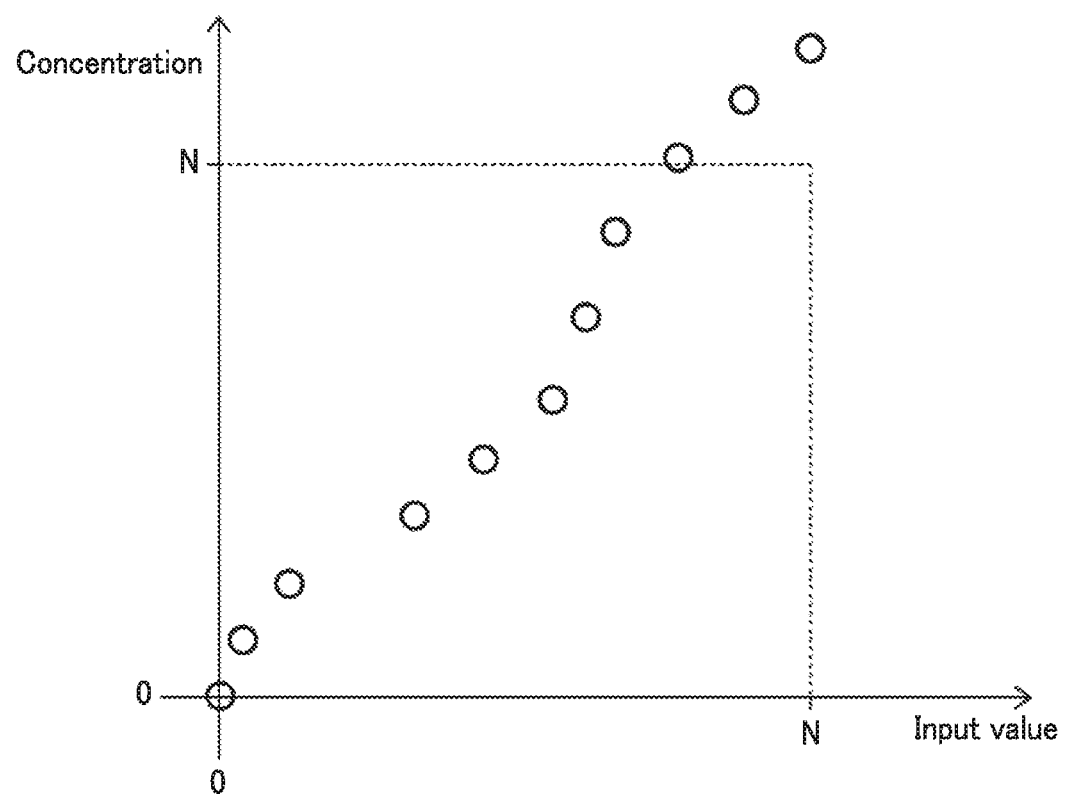
FIG. 7 is a diagram illustrating input/output characteristics obtained through interpolation executed on the input/output characteristics shown in FIG. 6.

FIG. 7 shows a graph obtained through the interpolation executed on the input/output characteristics shown in FIG. 6. In FIG. 7, a horizontal axis represents input values and a vertical axis represents concentration values.

As shown in FIG. 7, as a result of the interpolation executed in step S60, the sampling points are arranged in a manner such as to be smoothly connected together.

As shown in FIG. 3, after the process of step S60, the calibration section 19b (controller 19) generates a gamma correction table (step S61). The gamma correction table is generated based on the graph generated in step S60 and the desired input/output characteristics.

Figure 8:
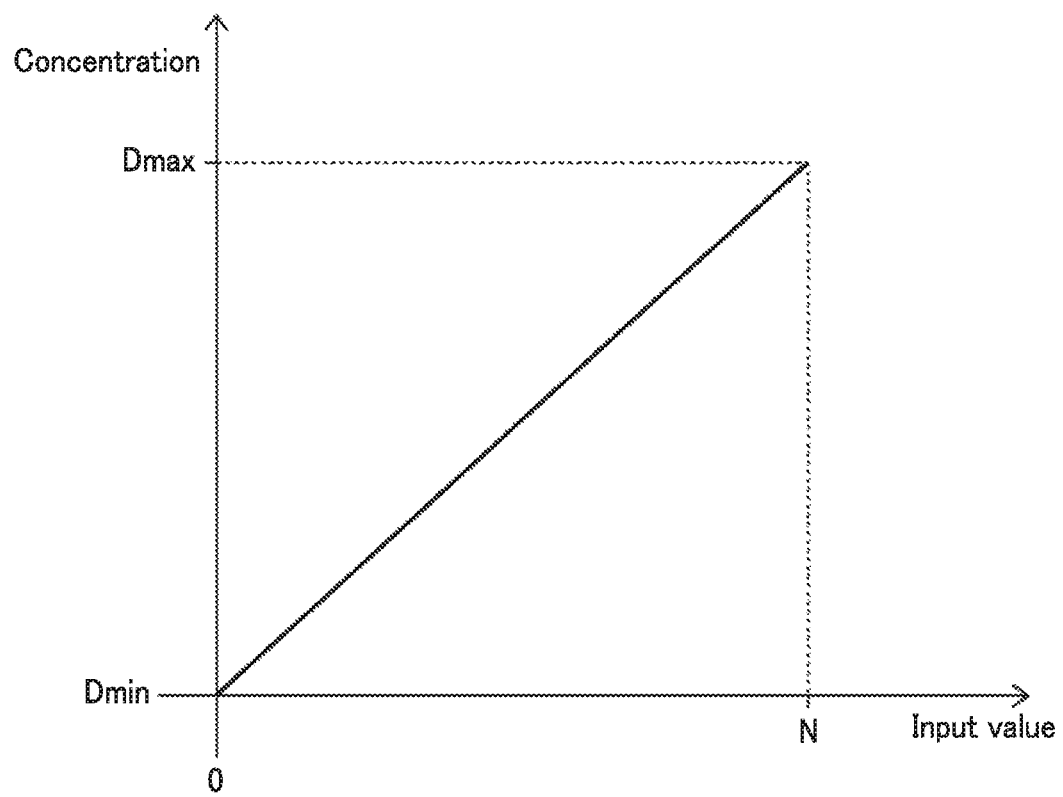
FIG. 8 is a diagram illustrating one example of desired input/output characteristics in the MFP shown in FIG. 1.
Figure 9:
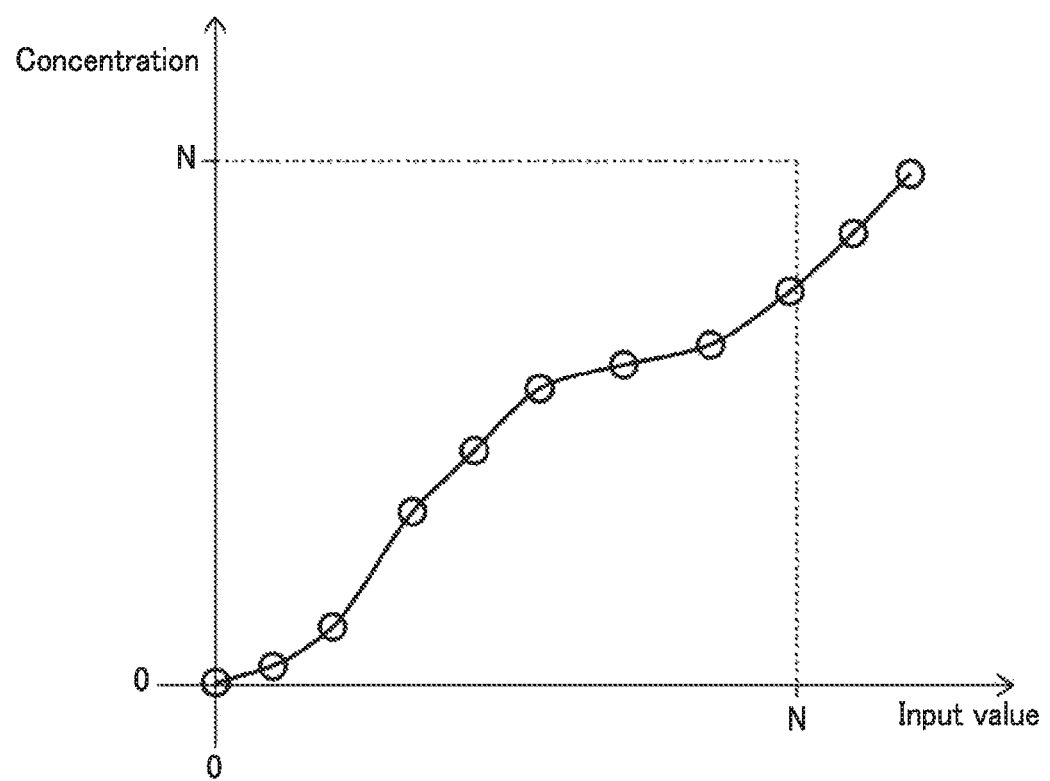
FIG. 9 is a diagram illustrating a graph with a function inverse of that of a graph shown in FIG. 7.
Figure 10:
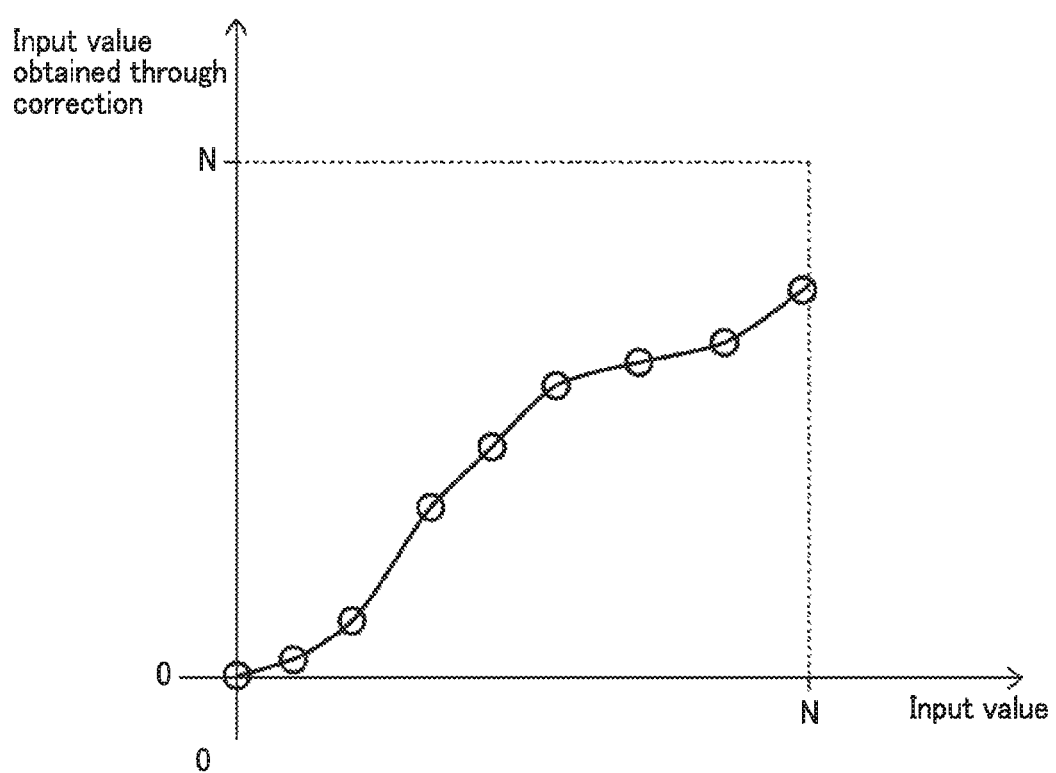
FIG. 10 is a diagram illustrating a gamma correction table generated from the graph shown in FIG. 7.

FIG. 8 is a diagram illustrating one example of the desired input/output characteristics. In FIG. 8, a horizontal axis represents input values and a vertical axis represents concentration values. The desired input/output characteristics are stored in the storage device 18. FIG. 9 is a diagram illustrating a graph with a function inverse of that of the graph shown in FIG. 7. In FIG. 9, a horizontal axis represents input values and a vertical axis represents concentration values. FIG. 10 is a diagram illustrating a gamma correction table generated from the graph shown in FIG. 7. In FIG. 10, a horizontal axis represents input values and a vertical axis represents input values obtained through gamma correction.

With the desired input/output characteristics shown in FIG. 8, the input values and the output values are in directly proportional relationship. In this case, the calibration section 19b (controller 19) generates a graph line-symmetric to the graph shown in FIG. 7 with the graph shown in FIG. 8 as a symmetry axis. More specifically, the graph shown in FIG. 9 is generated. In other words, the graph shown in FIG. 9 is a graph with a function inverse of that of the graph shown in FIG. 7. The calibration section 19b, on the graph shown in FIG. 9, excludes any value exceeding the designed maximum value N of the MFP 10 to thereby generate the gamma correction table shown in FIG. 10. In other words, the calibration section 19b excludes any concentration value exceeding the designed maximum concentration value Dmax of the MFP 10 to thereby generate the gamma correction table.

As shown in FIG. 3, after the process of step S61, the calibration section 19b (controller 19) updates the gamma correction table 18b corresponding to the screen 18c used in step S51 to the gamma correction table generated in step S61 (step S62). The operation shown in FIG. 3 ends as a result of the update of the gamma correction table 18b.

As a result of gamma conversion of the input/output characteristics shown in FIG. 5 with reference to the gamma correction table shown in FIG. 10 by the MFP 10, the input/output characteristics shown in FIG. 5 are changed to the input/output characteristics shown in FIG. 8.

Next, operation performed by the MFP 10 at time of execution of printing will be described.

Figure 11:
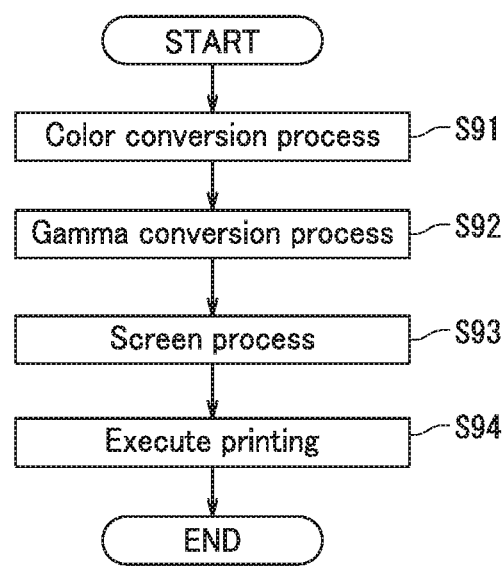
FIG. 11 is a flowchart of an operation performed by the MFP shown in FIG. 1 at time of execution of printing.

The MFP 10 executes operation shown in FIG. 11 at time of the execution of printing.

FIG. 11 is a flowchart of the operation performed by the MFP 10 at time of the execution of printing.

As shown in FIG. 11, the controller 19 of the MFP 10 subjects RGB values of image data to be printed to color conversion into CMYK values (step S91).

Next, with reference to the gamma correction table 18b, the gamma correction section 19a (controller 19) performs gamma conversion on a tone of the image data subjected to the color conversion in step S91 (step S92). Through the gamma correction, the input/output characteristics of the printer 14 are corrected. Note that the gamma correction section 19a refers, in step S92, to the gamma correction table 18b corresponding to the screen 18c used in step S93 to be described later on.

The controller 19 performs a screen process on the image data subjected to the gamma correction in step S92 (step S93). More specifically, the controller 19 performs the screen process by use of the screen 18c corresponding to the gamma correction table 18b referenced in step S92. Through the screen process, half-tone data is generated.

The controller 19 causes the printer 14 to execute printing based on the half-tone data generated in step S93 (step S94). Operation shown in FIG. 11 ends as a result of the execution of printing by the printer 14.

As described above, if the concentration value detected by the photo sensor 15 is a value within the corresponding variation range 18f (YES in step S57), the MFP 10 converts the detected concentration value into the corresponding specific concentration value 18e (step S58). This can consequently make the input/output characteristics of the printer 14 equal to or close to the desired input/output characteristics. Therefore, the MFP 10 can improve the input/output characteristics of the printer 14.

The desired input/output characteristics are not limited to those with a directly proportional relationship. The desired input/output characteristics may include those with non-linear relationship between input values and output values.

Moreover, the MFP 10 uses the entire variation range 18f in the processes but may use part of the variation range 18f. For example, the MFP 10 may use a range from a lower limit value of the variation range 18f to the specific concentration value 18e. Alternatively, the MFP 10 may use a range from the specific concentration value 18e to an upper limit value of the variation range 18f. For example, as a result of judgment that the output of the normalized input/output characteristics is included within the range from the specific concentration value 18e to the upper limit value of the variation range 18f (Yes in step S57), the calibration section 19b (controller 19) may convert the output of the normalized input/output characteristics into the specific concentration value 18e (step S58).

Even in a case where a concentration value Dout corresponding to a concentration value Din detected by the photo sensor 15 exceeds the "N" corresponding to the designed maximum concentration value Dmax of the MFP 10, the MFP 10 does not convert the concentration value Dout into a value equal to or less than the "N". The MFP 10 excludes the concentration value Dout exceeding the "N" to thereby generate the gamma correction table (step S60). This can consequently make the input/output characteristics of the printer 14 equal to or close to the desired input/output characteristics. Therefore, the MFP 10 can improve the input/output characteristics of the printer 14.

Figure 13:
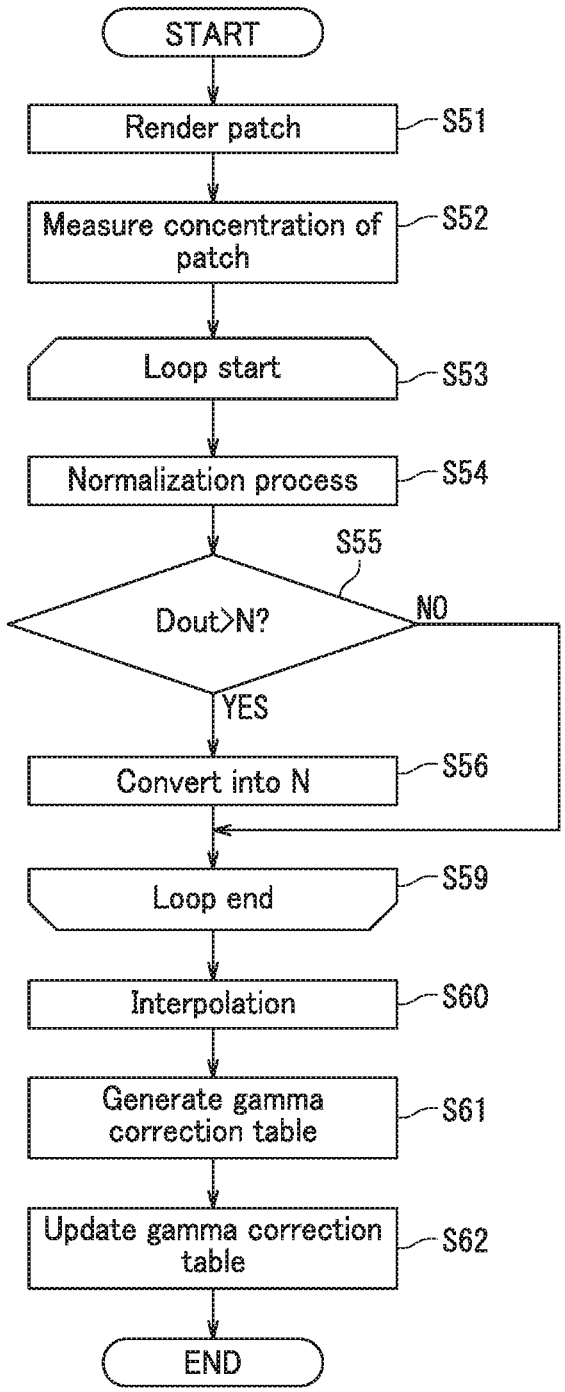
FIG. 13 is a flowchart of an operation performed by a typical image forming apparatus at time of execution of calibration.
Figure 14:
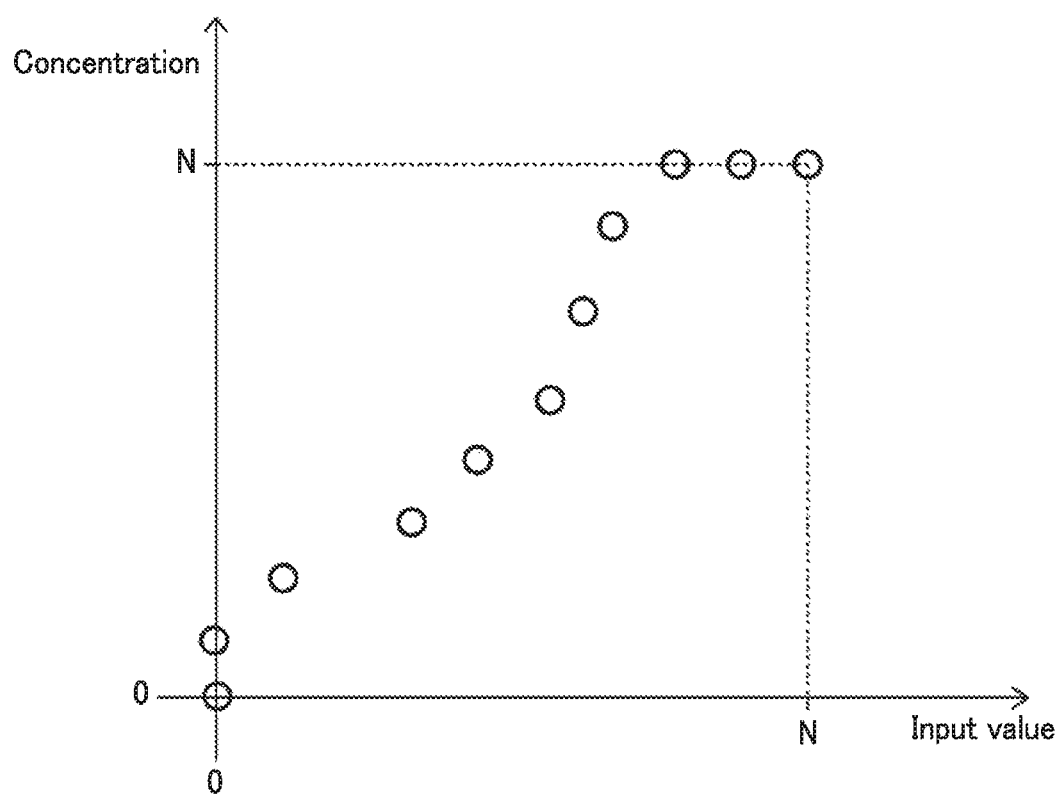
FIG. 14 is a diagram obtained by normalizing the input/output characteristics shown in FIG. 5 by the typical image forming apparatus.
Figure 15:
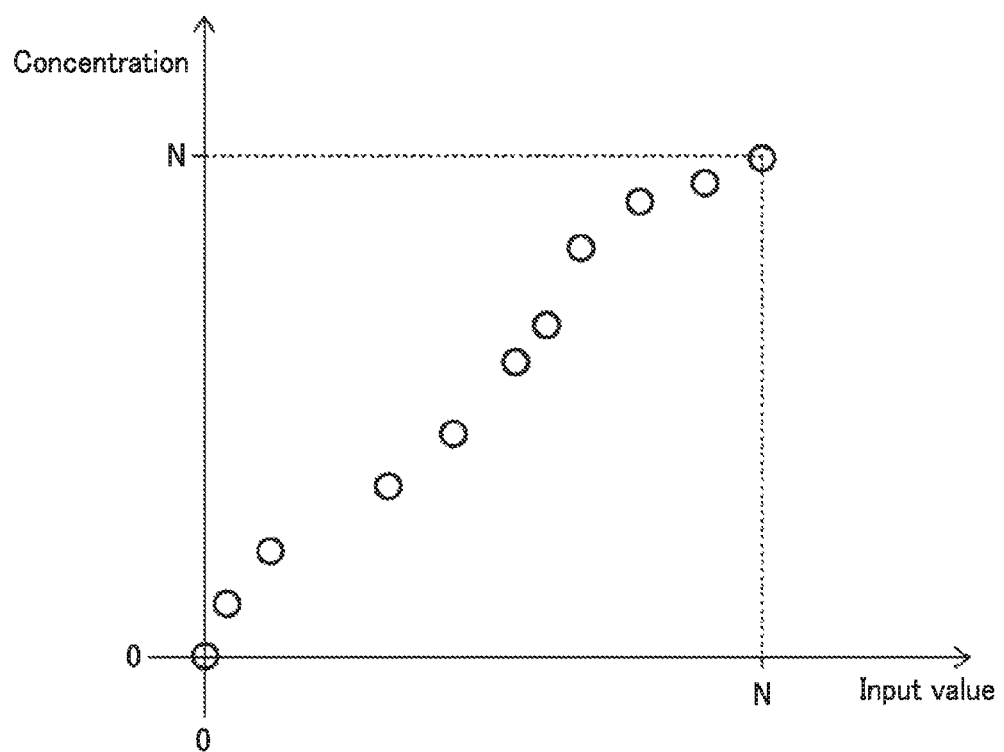
FIG. 15 is a diagram illustrating input/output characteristics obtained through interpolation executed on the input/output characteristics shown in FIG. 14.
Figure 16:
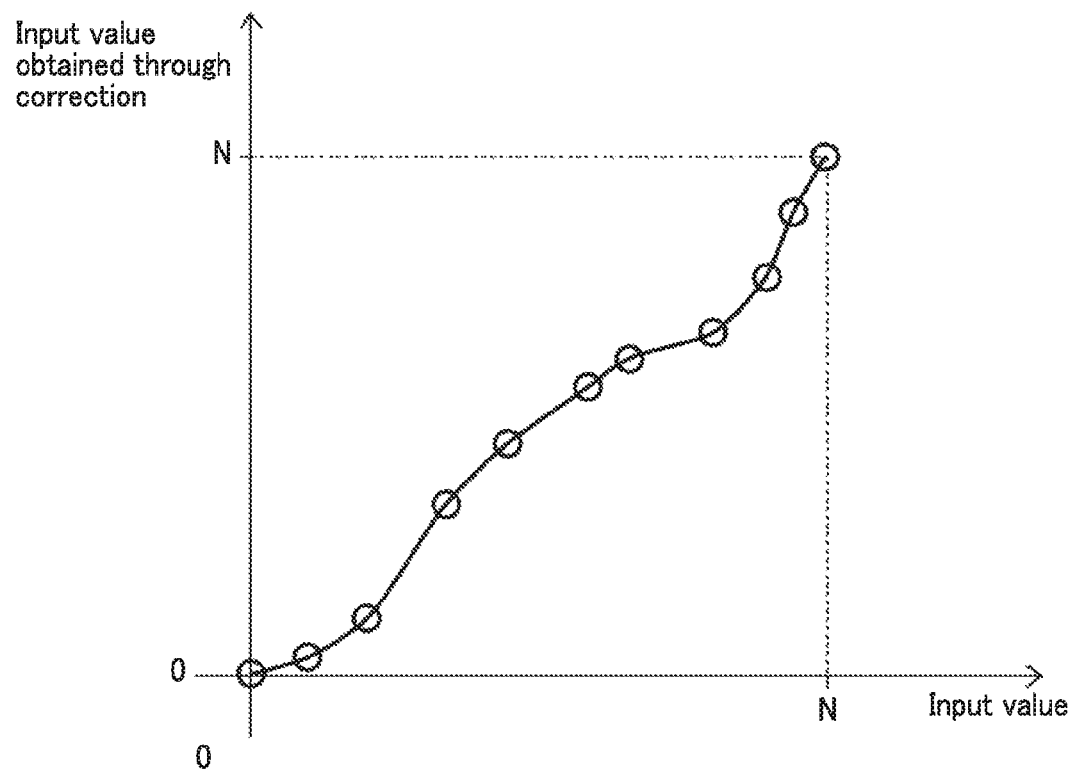
FIG. 16 is a diagram illustrating a gamma correction table generated from a graph shown in FIG. 15.
Figure 17:
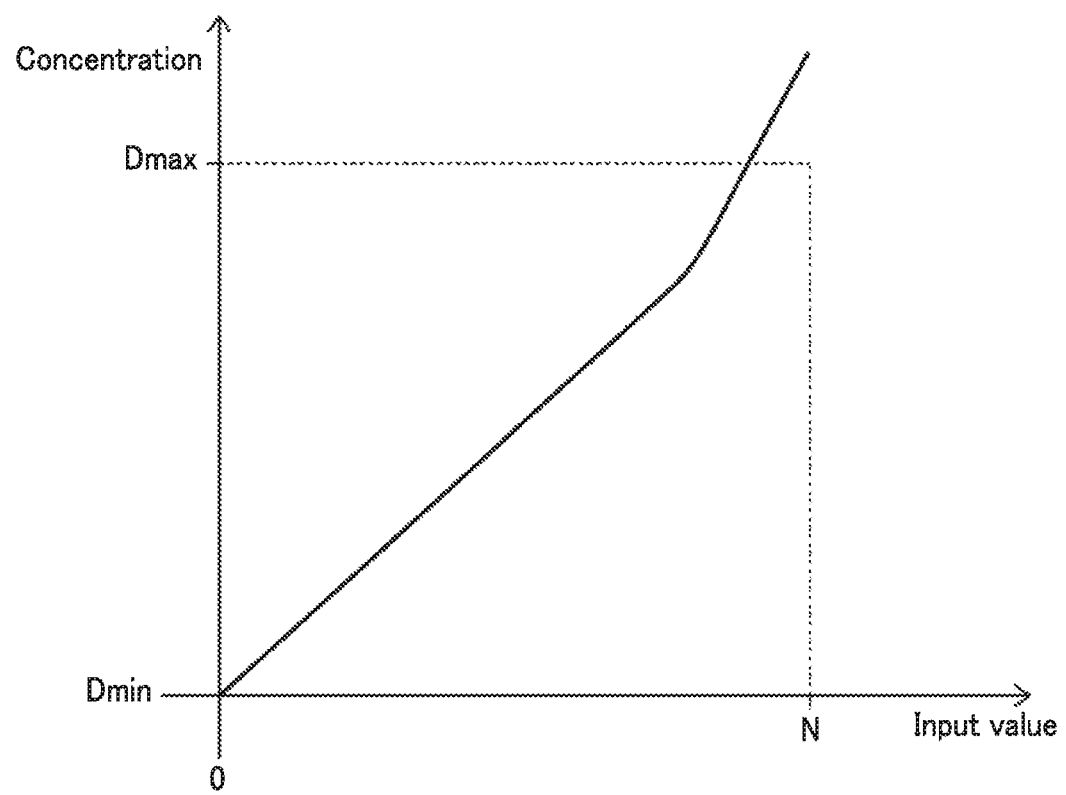
FIG. 17 is a diagram illustrating input/output characteristics subjected to gamma correction by the gamma correction table shown in FIG. 16.

As shown in FIG. 3, even in a case where a concentration value Dout obtained by the normalization exceeds the designed maximum tone value N of the MFP 10, the MFP 10 does not convert the concentration value Dout into a value equal to or less than the "N". Therefore, compared to configuration such that the concentration value Dout exceeding the maximum tone value N is converted into the "N" as shown in FIG. 13, the calibration program 18a can be simplified. The simplification of the calibration program 18a can reduce process loads for executing the calibration program 18a. Further, it can also reduce storage capacity required for storing the calibration program 18a.

In a case where a concentration value Dout corresponding to a concentration value Din detected by the photo sensor 15 exceeds a calculation upper-limit value set for a calculation process, the MFP 10 converts the concentration value Dout into the calculation upper-limit value. The calculation upper-limit value is larger than the maximum tone value N. For example, in a case where the maximum tone value N is 255, the calculation upper-limit value may be 511.

Figure 12:
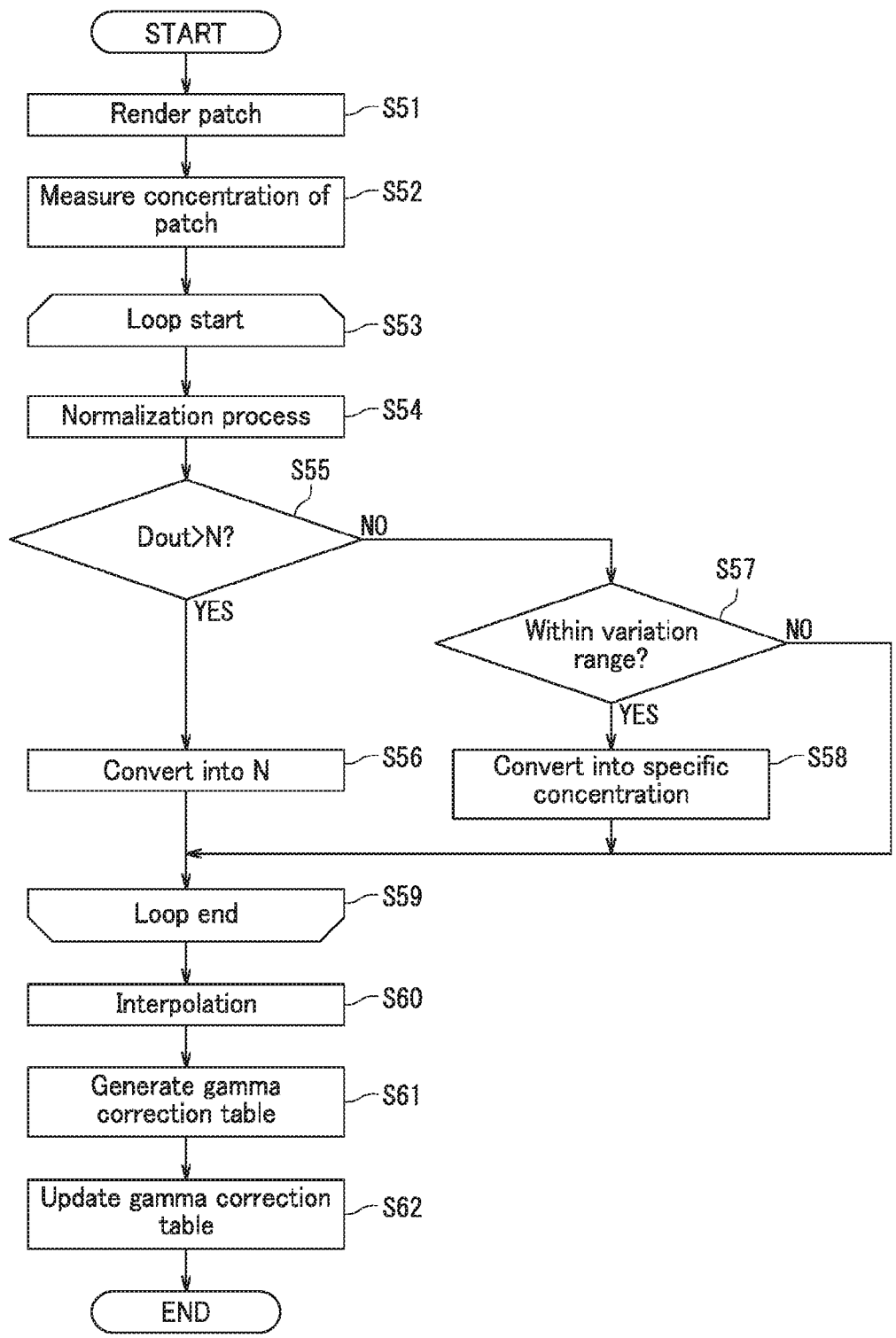
FIG. 12 is a flowchart of another operation performed by the MFP shown in FIG. 1 at time of the execution of calibration.

FIG. 12 is a flowchart of another operation performed by the MFP 10 at time of the execution of calibration. FIG. 12 shows the operation different from that shown in FIG. 3.

The MFP 10 may execute the operation shown in FIG. 12 in place of the operation shown in FIG. 3.

The operation shown in FIG. 12 is different from the operation shown in FIG. 3 in the following points.

As shown in FIG. 1 as a result of start of the loop process (step S53), the MFP 10 repeats the processes of steps S54 to S58.

After the process of step S54, the MFP 10 judges whether or not the concentration value Dout generated in step S54 exceeds the "N" (step S55).

As a result of judgment that the concentration value Dout exceeds the "N" (Yes in step S55), the MFP 10 converts the concentration value Dout into the "N" (step S56).

As a result of judgment that the concentration value Dout does not exceed the "N" (No in step S55), the MFP 10 executes the processes of steps S57 and S58.

In the embodiment of this disclosure, the image forming apparatus is an MFP, hut the image forming apparatus may be any image forming apparatus, other than the MFP, such as a printer dedicated machine, a copy dedicated machine or a facsimile dedicated machine.

What is claimed is:
1. An image forming apparatus comprising:
a printing device for printing, with concentration corresponding to each input value, an image on a recording medium for the each input value;
a detection device for detecting a concentration value of the each image;
a processor for correcting input/output characteristics of the printing device with reference to a gamma correction table for correcting the input/output characteristics of the printing device; and
a storage device for storing each variation information previously set for the each input value, wherein
the each variation information indicates a specific concentration value and a range of variation from the specific concentration value,
the processor executes a conversion process on the concentration values detected by the detection device, and based on the each concentration value obtained through the conversion process, newly generates the gamma correction table to thereby update the gamma correction table, and the processor, at time of the execution of the conversion process, converts, of the concentration values detected by the detection device, the concentration value exceeding a designed maximum concentration value into the maximum concentration value, and converts, of the concentration values detected by the detection device, the concentration value not exceeding the maximum concentration value and being included in the corresponding variation range into the corresponding specific concentration value.

2. The image forming apparatus according to claim 1, wherein the processor, at time of the execution of the conversion process, normalizes the each concentration value detected by the detection device, and converts, of the concentration values obtained by the normalization, the concentration value included in the corresponding variation range into the corresponding specific concentration value.

3. The image forming apparatus according to claim 1, wherein the processor executes interpolation on the each concentration value obtained through the conversion process, and based on the each concentration value obtained through the execution of the interpolation, newly generates the gamma correction table.

4. A non-transitory computer-readable recording medium including a calibration program to be executed by a computer, wherein the calibration program includes:

a first program code for causing the computer to command a printing device to print an image on a recording medium for each input value with concentration corresponding to the each input value;

a second program code for causing the computer to command a detection device to detect a concentration value of the each image;

a third program code causing the computer to execute, on the each concentration value detected by the detection device, a conversion process based on each variation information previously set for the each input value; and a fourth program code causing the computer to update a gamma correction table based on the each concentration value obtained through the conversion process, the each variation information indicates a specific concentration value and a range of variation from the specific concentration value, and the conversion process is a process of converting, of the concentration values detected by the detection device, the concentration value exceeding a designed maximum concentration value into the maximum concentration value by the computer, and converting, of the concentration values detected by the detection device, the concentration value not exceeding the maximum concentration value and included in the corresponding variation range into the corresponding specific concentration value by the computer.

* * * * *